(12) United States Patent
Ma et al.

(10) Patent No.: US 9,905,894 B2
(45) Date of Patent: Feb. 27, 2018

(54) LITHIUM AIR BATTERY

(71) Applicant: Samsung Electronics Co., Ltd., Suwon-si, Gyeonggi-do (KR)

(72) Inventors: Sang-bok Ma, Suwon-si (KR); Dong-joon Lee, Yongin-si (KR); Dong-min Im, Seoul (KR); Ki-hyun Kim, Seoul (KR); Tae-young Kim, Seoul (KR); Min-sik Park, Hwaseong-si (KR); Won-sung Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 76 days.

(21) Appl. No.: 14/291,154

(22) Filed: May 30, 2014

(65) Prior Publication Data
US 2015/0104720 A1    Apr. 16, 2015

(30) Foreign Application Priority Data
Oct. 10, 2013   (KR) .................. 10-2013-0120877

(51) Int. Cl.
H01M 12/02  (2006.01)
H01M 12/08  (2006.01)

(52) U.S. Cl.
CPC .... H01M 12/08 (2013.01); H01M 2300/0082 (2013.01); H01M 2300/0088 (2013.01); H01M 2300/0094 (2013.01); Y02E 60/128 (2013.01)

(58) Field of Classification Search
None
See application file for complete search history.

(56) References Cited

U.S. PATENT DOCUMENTS 7,115,706 B2 * 10/2006 Hollingsworth ....... C08G 65/22
                                                                                        430/637
7,745,053 B2    6/2010 Lee et al.
(Continued)

FOREIGN PATENT DOCUMENTS

EP           1033731 A2 *  6/2000    ............... H01G 9/20
JP           04288323 A  * 10/1992    ............ H01M 10/40
KR    1020120063163 A     6/2012

OTHER PUBLICATIONS

Machine Translation of JP04288323A.*
STIC search by Changqing Li.*

Primary Examiner — Miriam Stagg
Assistant Examiner — Victoria Lynch
(74) Attorney, Agent, or Firm — Cantor Colburn LLP

(57) ABSTRACT

A lithium air battery including an anode for intercalating/deintercalating lithium ions; a cathode having oxygen as a cathode active material, a lithium ion conductive solid electrolyte membrane disposed between the anode and the cathode; and an electrolyte, wherein the electrolyte is disposed between the lithium ion conductive solid electrolyte membrane and the cathode, and wherein the electrolyte includes at least one compound selected from a compound represented by Formula 1 and a copolymer including a repeating unit represented by Formula 2 as an additive:

Formula 1

(Continued)

-continued

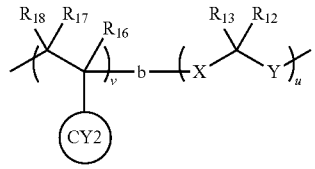

Formula 2 wherein in Formulae 1 and 2, groups CY1, CY2, a, b, c, b, $R_1$ to $R_{18}$, and variables t, u, and v are defined in the specification.

20 Claims, 3 Drawing Sheets

(56) References Cited

U.S. PATENT DOCUMENTS

| | | | |
|---|---|---|---|
| 2008/0290022 A1 | 11/2008 | Sanchez et al. | |
| 2012/0315547 A1* | 12/2012 | Itoh | C08F 299/024 429/312 |
| 2013/0108934 A1* | 5/2013 | Lee | H01M 10/052 429/405 |
| 2013/0144194 A1 | 6/2013 | Ahn et al. | |

* cited by examiner

LITHIUM AIR BATTERY

CROSS-REFERENCE TO RELATED APPLICATIONS

This application claims priority to Korean Patent Application No. 10-2013-0120877, filed on Oct. 10, 2013, in the Korean Intellectual Property Office, and all the benefits accruing therefrom under 35 U.S.C. § 119, the disclosure of which is incorporated herein in its entirety by reference.

BACKGROUND

1. Field

The present disclosure relates to a lithium air battery.

2. Description of the Related Art

A lithium air battery has been known to include an anode capable of intercalating/deintercalating lithium ions, a cathode having oxygen as a cathode active material and a porous carbon material, and an electrolyte disposed between the cathode and the anode.

The lithium air battery uses lithium as an anode, so it is not necessary to store air as a cathode active material within the lithium air battery, thus enabling its high capacity. The theoretical energy density per unit weight of the lithium air battery is very high, for example 3,500 watt hours per kilogram (Wh/kg) or higher. The energy density of the lithium air battery is about 10 times higher than that of a lithium ion battery.

However, when a small amount of electrolyte is used to improve permeability of oxygen used as a cathode active material, it is difficult to form a boundary that contacts with air due to the hydrophilic property of the electrolyte and the hydrophobic properties of a porous carbon material included in the cathode, thus lowering the charge/discharge capacity, charge/discharge efficiency, and discharge voltage of a cathode of a lithium air battery. Accordingly, it is desired that a boundary of the electrolyte, and the porous carbon material included in the cathode and oxygen be expanded so that the charge/discharge capacity, charge/discharge efficiency, and discharge voltage of the cathode of the lithium air battery can be improved. Thus, there remains a need in a lithium air battery with improved charge/discharge capacity, charge/discharge efficiency, and discharge voltage of a cathode.

SUMMARY

Provided is a lithium air battery with improved charge/discharge capacity, charge/discharge efficiency, and discharge voltage of a cathode by adding an additive with a structure having an affinity to both a porous carbon material and an electrolyte.

Additional aspects will be set forth in part in the description which follows and, in part, will be apparent from the description, or may be learned by practice of the presented embodiments.

According to an aspect, a lithium air battery includes:
an anode for intercalating/deintercalating lithium ions;
a cathode comprising oxygen as a cathode active material,
a lithium ion conductive solid electrolyte membrane disposed between the anode and the cathode; and
an electrolyte,
wherein the electrolyte is disposed between the lithium ion conductive solid electrolyte membrane and the cathode, and wherein the electrolyte comprises at least one compound selected from a compound represented by Formula 1 and a copolymer comprising a repeating unit represented by Formula 2 as an additive:

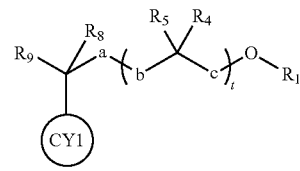

Formula 1 wherein, in Formula 1,
CY1 is a substituted or unsubstituted $C_6$-$C_{30}$ aromatic ring or a substituted or unsubstituted $C_3$-$C_{30}$ heteroaromatic ring;
a is a substituted or unsubstituted $C_1$-$C_6$ alkylene group;
b is

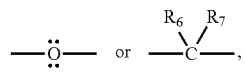

and c is

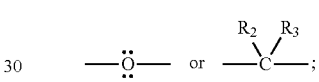

$R_1$ to $R_9$ are independently a hydrogen atom, a halogen atom, a nitro group, an amino group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2R_a$, —S(=O)$_2$NHS(=O)$_2R_a$, —P($R_a$)$_2$, —P(=O)($R_a$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_3$-$C_{30}$ cycloalkyl group, a substituted or unsubstituted $C_3$-$C_{30}$ cycloalkenyl group, a substituted or unsubstituted $C_2$-$C_{30}$ heterocycloalkyl group, a substituted or unsubstituted $C_2$-$C_{30}$ heterocycloalkenyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_6$-$C_{30}$ heteroaryl group, a substituted or unsubstituted $C_2$-$C_{30}$ heteroaryloxy group, a substituted or unsubstituted $C_3$-$C_{30}$ heteroarylalkyl group, or a combination thereof, wherein $R_a$ is a hydrogen atom, a $C_1$-$C_{10}$ alkyl group, or a $C_6$-$C_{20}$ aryl group; and
t is between 1 and 100,000;

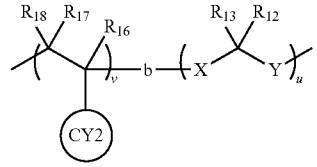

Formula 2 wherein, in Formula 2,
CY2 is a substituted or unsubstituted $C_6$-$C_{30}$ aromatic ring or a substituted or unsubstituted $C_3$-$C_{30}$ heteroaromatic ring;
b is a block copolymer;

X is

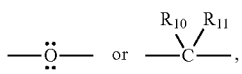

and Y is

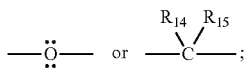

$R_{10}$ to $R_{18}$ are independently a hydrogen atom, a halogen atom, a nitro group, an amino group, a cyano group, a hydroxyl group, —C(=O)$R_{a1}$, —C(=O)O$R_{a1}$, —OCO (O$R_{a1}$), —C=N($R_{a1}$), —S$R_{a1}$, —S(=O)$R_{a1}$, —S(=O)$_2$ $R_{a1}$, —S(=O)$_2$NHS(=O)$_2R_{a1}$, —P($R_{a1}$)$_2$, —P(=O) ($R_{a1}$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_3$-$C_{30}$ cycloalkyl group, a substituted or unsubstituted $C_3$-$C_{30}$ cycloalkenyl group, a substituted or unsubstituted $C_2$-$C_{30}$ heterocycloalkyl group, a substituted or unsubstituted $C_2$-$C_{30}$ heterocycloalkenyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_6$-$C_{30}$ heteroaryl group, a substituted or unsubstituted $C_2$-$C_{30}$ heteroaryloxy group, a substituted or unsubstituted $C_3$-$C_{30}$ heteroarylalkyl group, or a combination thereof, wherein $R_{a1}$ is a hydrogen atom, a $C_1$-$C_{10}$ alkyl group, or a $C_6$-$C_{20}$ aryl group; and v and u are each independently between 1 and 100,000.

ADVANTAGEOUS EFFECTS OF THE INVENTIVE CONCEPT

According to an aspect, an electrolyte disposed between a lithium ion conductive solid electrolyte membrane and a cathode of a lithium air battery includes at least one additive selected from the compound represented by Formula 1 and the copolymer having the repeating unit represented by Formula 2, thereby improving charge/discharge capacity, charge/discharge efficiency, and discharge voltage of the cathode of the lithium air battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
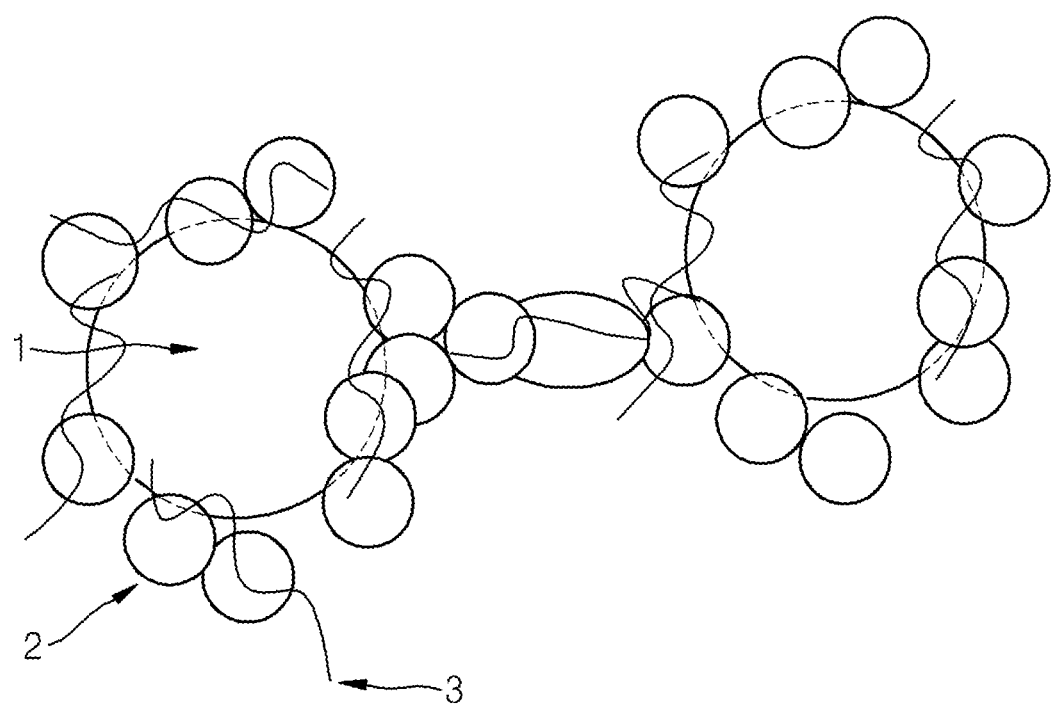
FIG. 1 is a diagram illustrating that the additive 3 according to an embodiment is distributed over the surface where a porous carbon material 1, which is included in a cathode, and electrolyte particles 2 are bound.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, there is provided a lithium air battery including an for intercalating/deintercalating lithium ions;

a cathode comprising oxygen as a cathode active material;

a lithium ion conductive solid electrolyte membrane disposed between the anode and the cathode; and an electrolyte, wherein the electrolyte is disposed between the lithium ion conductive solid electrolyte membrane and the cathode, and wherein the electrolyte includes at least one compound selected from a compound represented by Formula 1 and a copolymer including a repeating unit represented by Formula 2 as an additive:

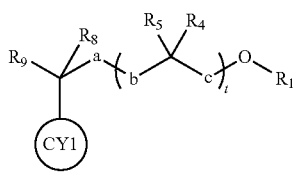

Formula 1 wherein, in Formula 1,

CY1 is a substituted or unsubstituted $C_6$-$C_{30}$ aromatic ring or a substituted or unsubstituted $C_3$-$C_{30}$ heteroaromatic ring;

a is a substituted or unsubstituted $C_1$-$C_5$ alkylene group;

b is

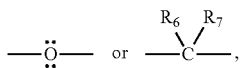

and c is

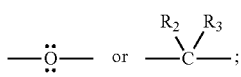

$R_1$ to $R_9$ are independently a hydrogen atom, a halogen atom, a nitro group, an amino group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2R_a$, —S(=O)$_2$NHS(=O)$_2R_a$, —P($R_a$)$_2$, —P(=O)($R_a$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_3$-$C_{30}$ cycloalkyl group, a substituted or unsubstituted $C_3$-$C_{30}$ cycloalkenyl group, a substituted or unsubstituted $C_2$-$C_{30}$ heterocycloalkyl group, a substituted or unsubstituted $C_2$-$C_{30}$ heterocycloalkenyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_6$-$C_{30}$ heteroaryl group, a substituted or unsubstituted $C_2$-$C_{30}$ heteroaryloxy group, a substituted or unsubstituted $C_3$-$C_{30}$ heteroarylalkyl group, or a combination thereof, wherein $R_a$ is a hydrogen atom, a $C_1$-$C_{10}$ alkyl group, or a $C_6$-$C_{20}$ aryl group; and t is between 1 and 100,000;

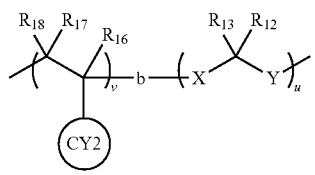

Formula 2 wherein, in Formula 2,

CY2 is a substituted or unsubstituted $C_6$-$C_{30}$ aromatic ring or a substituted or unsubstituted $C_3$-$C_{30}$ heteroaromatic ring;

b is a block copolymer;

X is

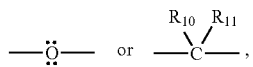

and Y is

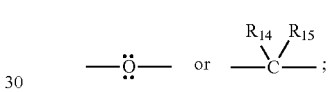

$R_{10}$ to $R_{18}$ are independently a hydrogen atom, a halogen atom, a nitro group, an amino group, a cyano group, a hydroxyl group, —C(=O)$R_{a1}$, —C(=O)O$R_{a1}$, —OCO(O$R_{a1}$), —C=N($R_{a1}$), —S$R_{a1}$, —S(=O)$R_{a1}$, —S(=O)$_2R_{a1}$, —S(=O)$_2$NHS(=O)$_2R_{a1}$, —P($R_{a1}$)$_2$, —P(=O)($R_{a1}$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_3$-$C_{30}$ cycloalkyl group, a substituted or unsubstituted $C_3$-$C_{30}$ cycloalkenyl group, a substituted or unsubstituted $C_2$-$C_{30}$ heterocycloalkyl group, a substituted or unsubstituted $C_2$-$C_{30}$ heterocycloalkenyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_6$-$C_{30}$ heteroaryl group, a substituted or unsubstituted $C_2$-$C_{30}$ heteroaryloxy group, a substituted or unsubstituted $C_3$-$C_{30}$ heteroarylalkyl group, or a combination thereof, wherein $R_{a1}$ is a hydrogen atom, a $C_1$-$C_{10}$ alkyl group, or a $C_6$-$C_{20}$ aryl group; and v and u are each independently between 1 and 100,000.

In Formula 2, the italic "b" refers to a block copolymer.

CY1 and CY2 may be each independently a substituted or unsubstituted benzene ring, a substituted or unsubstituted pentacene ring, a substituted or unsubstituted indene ring, a substituted or unsubstituted naphthalene ring, a substituted or unsubstituted azulene ring, a substituted or unsubstituted heptalene ring, a substituted or unsubstituted indacene ring, a substituted or unsubstituted acenaphthalene ring, a substituted or unsubstituted fluorene ring, a substituted or unsubstituted phenalene ring, a substituted or unsubstituted phenanthrene ring, a substituted or unsubstituted anthracene ring, a substituted or unsubstituted fluoranthene ring, a substituted or unsubstituted triphenylene ring, a substituted or unsubstituted pyrene ring, a substituted or unsubstituted benzopyrene ring, a substituted or unsubstituted chrysene ring, a substituted or unsubstituted naphthacene ring, a substituted or unsubstituted phycene ring, a substituted or unsubstituted perylene ring, a substituted or unsubstituted pentaphene ring, a substituted or unsubstituted hexacene ring, a substituted or unsubstituted pyrrole ring, a substituted or unsubstituted pyrazole ring, a substituted or unsubstituted imidazole ring, a substituted or unsubstituted imidazopyridine ring, a substituted or unsubstituted imidazopyrimidine, a substituted or unsubstituted pyridine ring, a substituted or unsubstituted pyrazine ring, a substituted or unsubstituted pyrimidine ring, a substituted or unsubstituted pyridazine ring, a substituted or unsubstituted indole ring, a substituted or unsubstituted purine ring, a substituted or unsubstituted quinoline ring, a substituted or unsubstituted phthalazine ring, a substituted or unsubstituted naphthridine ring, a substituted or unsubstituted quinazoline ring, a substituted or unsubstituted cinnoline ring, a substituted or unsubstituted indazole ring, a substituted or unsubstituted carbazole ring, a substituted or unsubstituted phenazine ring, a substituted or unsubstituted phenanthridine ring, a substituted or unsubstituted triazine ring, a substituted or unsubstituted phenanthroline ring, or a substituted or unsubstituted quinoxaline ring.

The substitution group(s) used in Formula 1 and Formula 2 may be defined as described herein below.

The term "substituted" used in Formula 1 and Formula 2 may refer to a hydrogen atom substituted with an alkyl group, an alkoxy group, an alkenyl group, an alkynyl group, a cycloalkyl group, a cycloalkenyl group, a heterocycloalkyl group, a heterocycloalkenyl group, an aryl group, an aryloxy group, arylalkyl group, a heteroaryl group, a heteroaryloxy group, a heteroarylalkyl group refers to being substituted into a halogen atom, a $C_1$-$C_{20}$ alkyl group substituted to a halogen atom (e.g., $CCF_3$, $CHCF_2$, $CH_2F$, $CCl_3$, etc.), a hydroxyl group, a nitro group, a cyano group, an amino group, an amidino group, a hydrazine group, a hydrazone group, a carboxyl group or salts thereof, a sulfonic acid or salts thereof, a phosphoric acid or salts thereof, or a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroaryl alkyl group.

As used herein, the term "alkyl" indicates a group derived from a completely saturated, branched or unbranched (or a straight or linear) hydrocarbon having a specified number of carbon atoms. The $C_1$-$C_{20}$ alkyl group used in Formula 1 and Formula 2 may, for example, include methyl, ethyl, propyl, isobutyl, sec-butyl, tert-butyl, neo-butyl, iso-amyl, hexyl, etc. At least one hydrogen atom of the alkyl group may be substituted by a group as provided in the definition of "substituted" above.

As used herein, the term "alkoxy" represents "alkyl-O—", wherein the term "alkyl" is the same as described above, and having a specified number of carbon atoms. The $C_1$-$C_{20}$ alkoxy group used in Formula 1 and Formula 2 may, for example, include methoxy, ethoxy, propoxy, etc. At least one hydrogen atom of the alkoxy group may be substituted by a group as provided in the definition of "substituted" above.

As used herein, the term "alkenyl" indicates a group derived from a branched or unbranched (or a straight or linear) hydrocarbon including at least one double bond and having a specified number of carbon atoms. The $C_2$-$C_{20}$ alkenyl group used in Formula 1 and Formula 2 may, for example, include vinylene, allylene, etc. At least one hydrogen atom of the alkenyl group may be substituted by a group as provided in the definition of "substituted" above.

As used herein, the term "alkynyl" indicates a group derived from a branched or unbranched (or a straight or linear) hydrocarbon including at least one double bond and having a specified number of carbon atoms. The $C_2$-$C_{20}$ alkynyl group used in Formula 1 and Formula 2 may, for example, include acetylene, etc. At least one hydrogen atom of the alkynyl group may be substituted by a group as provided in the definition of "substituted" above.

As used herein, the term "cycloalkyl" indicates a group having one or more saturated rings in which all ring members are carbon and having a specified number of carbon atoms. The $C_3$-$C_{30}$ cycloalkyl group used in Formula 1 and Formula 2 may, for example, include cyclopropyl, cyclobutyl, cyclopentyl, cyclohexyl, etc. At least one hydrogen atom of the cycloalkyl group may be substituted by a group as provided in the definition of "substituted" above.

As used herein, the term "cycloalkenyl" indicates a group derived from a branched or unbranched cyclic hydrocarbon with at least one carbon-carbon double bond inside the cyclic moiety and having a specified number of carbon atoms. The $C_3$-$C_{30}$ cycloalkenyl group used in Formula 1 and Formula 2 may, for example, include cyclopropenyl, cyclobutenyl, cyclopentenyl, cyclohexenyl, etc. At least one hydrogen atom of the cycloalkenyl group may be substituted by a group as provided in the definition of "substituted" above.

As used herein, the term "heterocycloalkyl" group indicates a cycloalkyl group that comprises at least one heteroatom covalently bonded to one or more carbon atoms of the cycloalkyl group and having a specified number of carbon atoms. Each heteroatom is independently chosen from nitrogen (N), oxygen (O), sulfur (S), and phosphorus (P). The $C_2$-$C_{30}$ heterocycloalkyl group used in Formula 1 and Formula 2 may, for example, include 2-tetrahydrofuranyl and 2-tetrahydropyranyl, etc. At least one hydrogen atom of the heterocycloalkyl group may be substituted by a group as provided in the definition of "substituted" above.

As used herein, the term "heterocycloalkenyl" group indicates a cycloalkenyl group that comprises at least one heteroatom covalently bonded to one or more carbon atoms of the cycloalkenyl group and having a specified number of carbon atoms. Each heteroatom is independently chosen from nitrogen (N), oxygen (O), sulfur (S), and phosphorus (P). The $C_2$-$C_{30}$ heterocycloalkenyl group used in Formula 1 and Formula 2 may, for example, include 2-(2H, 3H)-dihydrofuranyl and 2-(2H, 3H)-dihydropyranyl, etc. At least one hydrogen atom of the heterocycloalkenyl group may be substituted by a group as provided in the definition of "substituted" above.

As used herein, the term "aryl" group, which is used alone or in combination, indicates an aromatic hydrocarbon containing at least one ring. The term "aryl" is construed as including a group with an aromatic ring fused to at least one cycloalkyl ring and having a specified number of carbon atoms. The $C_6$-$C_{30}$ aryl group used in Formula 1 and Formula 2, alone or in a combination, refers to an aromatic system which includes at least one ring, and for example, may include phenyl, naphthyl, tetrahydronaphthyl, etc. In addition, at least one hydrogen atom of the aryl group may be substituted by a group as provided in the definition of "substituted" above.

As used herein, the term "aryloxy" indicates "–O-aryl". The $C_6$-$C_{30}$ aryloxy group used in Formula 1 and Formula 2 may, for example, include phenoxy, etc. At least one hydrogen atom of the aryloxy group may be substituted by a group as provided in the definition of "substituted" above.

As used herein, the term "arylalkyl" indicates an alkyl group substituted with an aryl group and having a specified number of carbon atoms. The $C_7$-$C_{30}$ cycloalkenyl group used in Formula 1 and Formula 2 may, for example, include benzyl, phenyl-$CH_2CH_2$—, etc. At least one hydrogen atom of the arylalkyl group may be substituted by a group as provided in the definition of "substituted" above.

As used herein, the term "heteroaryl group" indicates a monocyclic or bicyclic organic compound including at least one heteroatom selected from nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. The $C_6$-$C_{30}$ heteroaryl group used in Formula 1 and Formula 2 refers to an organic compound which includes at least one heteroatom selected from N, O, P, and S, and the remaining ring atom is carbon, and may include, for example, pyridyl, etc. In addition, at least one hydrogen atom of the heteroaryl group may be substituted by a group as provided in the definition of "substituted" above.

As used herein, the term "heteroaryloxy" indicates o-heteroaryl moiety. The $C_2$-$C_{30}$ cycloalkenyl group used in Formula 1 and Formula 2 may include, for example, pyridyloxy, etc. In addition, at least one hydrogen atom of the heteroaryloxy group may be substituted by a group as provided in the definition of "substituted" above.

As used herein, the term "heteroarylalkyl" group indicates an alkyl group substituted with a heteroaryl group. The $C_3$-$C_{30}$ heteroarylalkyl group used in Formula 1 and Formula 2 may, for example, include pyridyl-2-methyl, etc. In addition, at least one hydrogen atom of the heteroarylalkyl group may be substituted by a group as provided in the definition of "substituted" above.

A lithium air battery may include an aqueous electrolyte and a non-aqueous electrolyte as an electrolyte. When a non-aqueous electrolyte is included, the reaction mechanism may occur according to Reaction Scheme 1 below.

$4Li+O_2 \leftrightarrow 2Li_2O$  $E°=2.91$ V $2Li+O_2 \leftrightarrow Li_2O_2$  $E°=3.10$ V     Reaction Scheme 1

During discharging, the lithium ions derived from the anode meet with oxygen introduced from the cathode and form a lithium oxide while the oxygen becomes reduced (oxygen reduction reaction: ORR). In contrast, during charging, the lithium oxide becomes reduced thus generating oxygen via oxidation (oxygen evolution reaction: OER).

During discharging, $Li_2O_2$ is precipitated at the pores of the cathode. The capacity of the lithium air battery depends on the amount of the precipitated $Li_2O_2$ that fills into the pores of the cathode, and the amount of the precipitated $Li_2O_2$ that increases as the concentration of the oxygen being diffused into the cathode increases. Accordingly, it is necessary to increase oxygen permeability in order to increase oxygen concentration. In order to increase oxygen permeability, for example, a small amount of a lithium ion conductive liquid electrolyte or a lithium ion conductive polymer electrolyte may be used.

However, it may be difficult to form a boundary that contacts with air due to the hydrophilic property of the lithium ion conductive liquid electrolyte or the lithium ion conductive polymer electrolyte and the hydrophobic properties of a porous carbon material included in the cathode. As such, the charge/discharge capacity, charge/discharge efficiency, and discharge voltage of the cathode of a lithium air battery may be lowered.

Additionally, when an additive having a structure with an affinity for the lithium ion conductive liquid electrolyte or the lithium ion conductive polymer electrolyte, and an additive having a structure with an affinity for the porous carbon material included in the cathode, is added into the electrolyte, the additive becomes unevenly distributed to either the electrolyte or the porous carbon material, and thus it may be difficult to form a boundary that contacts with the electrolyte, the porous carbon material included in the cathode, and air, i.e., a triple phase boundary.

According to an embodiment, a lithium air battery may include an additive having a structure with an affinity for both the electrolyte and the porous carbon material included in the cathode, that is, a structure having a moiety including a CY1 or CY2 ring and an ether functional group, in the electrolyte. The additive may be a compound or a copolymer, and the compound may be an oligomer and/or a polymer of any type.

FIG. 1 is a diagram illustrating that an additive 3 according to an embodiment is distributed over the surface where a porous carbon material 1, which is included in a cathode, and electrolyte particles 2 are bound.

As shown in FIG. 1, the additive 3 is widely distributed such that the electrolyte particles 2 are bound to the particle surface of the porous carbon material 1 included in the cathode, and the additive 3 serves as a linker to connect the particles of the porous carbon material 1 and the electrolyte particles 2.

By extending the form of the triple phase boundary, which contacts with the porous carbon material included in the cathode including the electrolyte having at least one additive selected from a compound represented by Formula 1 and a copolymer including a repeating unit represented by Formula 2; an electrolyte, and air, and filling in the pores in a cathode with $Li_2O_2$, the discharge capacity and discharge voltage can be increased to thereby improve charge/discharge capacity and charge/discharge efficiency of a cathode of a lithium air battery.

For example, the electrolyte may include at least one compound selected from a compound represented by Formula 3 and a copolymer comprising a repeating unit represented by Formula 4 as an additive:

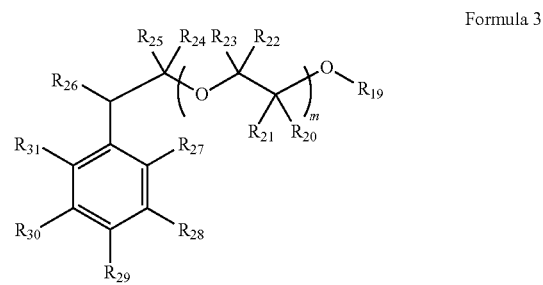

Formula 3 wherein, in Formula 3,
$R_{19}$ to $R_{31}$ are each independently a hydrogen atom, a halogen atom, a nitro group, an amino group, a cyano group, a hydroxyl group, —C(=O)$R_{a2}$, —C(=O)O$R_{a2}$, —OCO(O$R_{a2}$), —C=N($R_{a2}$), —S$R_{a2}$, —S(=O)$R_{a2}$, —S(=O)$_2$$R_{a2}$, —S(=O)$_2$NHS(=O)$_2$$R_{a2}$, —P($R_{a2}$)$_2$, —P(=O)($R_{a2}$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_3$-$C_{30}$ cycloalkyl group, a substituted or unsubstituted $C_3$-$C_{30}$ cycloalkenyl group, a substituted or unsubstituted $C_2$-$C_{30}$ heterocycloalkyl group, a substituted or unsubstituted $C_2$-$C_{30}$ heterocycloalkenyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_6$-$C_{30}$ heteroaryl group, a substituted or unsubstituted $C_2$-$C_{30}$ heteroaryloxy group, a substituted or unsubstituted $C_3$-$C_{30}$ heteroarylalkyl group, or a combination thereof, wherein $R_{a2}$ is a hydrogen atom, a $C_1$-$C_{10}$ alkyl group or a $C_6$-$C_{20}$ aryl group; and m is between 1 and 100,000;

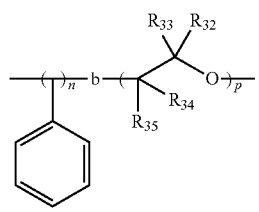

Formula 4 wherein, in Formula 4, b is a block copolymer;

$R_{32}$ to $R_{35}$ are each independently a hydrogen atom, a halogen atom, a nitro group, an amino group, a cyano group, a hydroxyl group, —C(=O)$R_{a3}$, —C(=O)O$R_{a3}$, —OCO (O$R_{a3}$), —C=N($R_{a3}$), —S$R_{a3}$, —S(=O)$R_{a3}$, —S(=O)$_2$$R_{a3}$, —S(=O)$_2$NHS(=O)$_2$$R_{a3}$, —P($R_{a3}$)$_2$, —P(=O)($R_{a3}$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_3$-$C_{30}$ cycloalkyl group, a substituted or unsubstituted $C_3$-$C_{30}$ cycloalkenyl group, a substituted or unsubstituted $C_2$-$C_{30}$ heterocycloalkyl group, a substituted or unsubstituted $C_2$-$C_{30}$ heterocycloalkenyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_6$-$C_{30}$ heteroaryl group, a substituted or unsubstituted $C_2$-$C_{30}$ heteroaryloxy group, a substituted or unsubstituted $C_3$-$C_{30}$ heteroarylalkyl group, or a combination thereof, wherein $R_{a3}$ is a hydrogen atom, a $C_1$-$C_{10}$ alkyl group, or a $C_6$-$C_{20}$ aryl group; and n and p are each independently between 1 and 100,000.

In Formula 4, the italic "b" refers to a block copolymer.

The substitution group(s) used in Formula 3 and Formula 4 is (are) the same as defined in Formula 1 and Formula 2 above.

For example, the electrolyte may include at least one compound selected from a compound represented by Formula 5 and a copolymer including a repeating unit represented by Formula 6 as an additive:

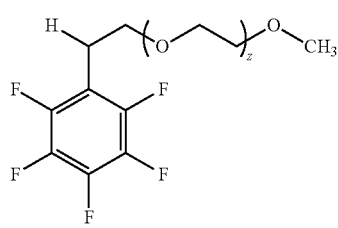

Formula 5 wherein, in Formula 5, z is between 1 and 100;

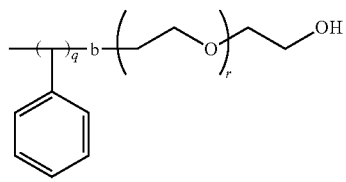

Formula 6 wherein, in Formula 6, b is a block copolymer;

q is between 10 and 100, and r is between 1,500 and 2,000.

The additives represented by Formulas 3 to 6 enable to form the triple phase boundary in a more easily expanded state, and fill in the pores of a cathode with $Li_2O_2$, and as a result, increase the discharge capacity and discharge voltage, thereby improving the charge/discharge capacity and charge/discharge efficiency of a cathode of a lithium air battery.

Figure 2:
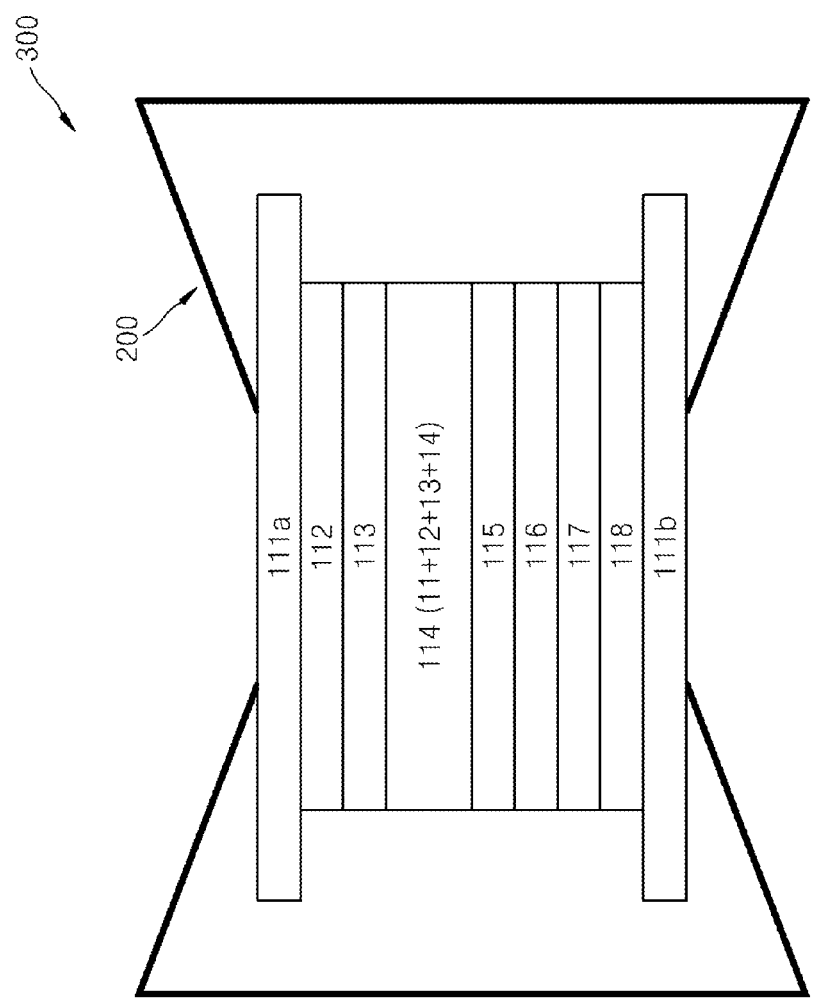
FIG. 2 is a schematic diagram illustrating a structure of a lithium air battery 300 according to an embodiment.

FIG. 2 is a schematic diagram illustrating a structure of a lithium air battery 300 according to an embodiment. As shown in FIG. 2, in the lithium air battery 300, a lithium ion conductive solid electrolyte membrane 115 is disposed in between a cathode 114 and an anode 117. Additionally, an electrolyte 13 is disposed in between the lithium ion conductive solid electrolyte membrane 115 and the cathode 114. The electrolyte 13 may include at least one compound selected from a compound represented by Formula 1 and a copolymer including a repeating unit represented by Formula 2 as an additive 14.

The cathode 114 may include a porous carbon material 11. The porous carbon material 11 may include, for example, carbon black, acetylene black, graphite, graphene, active carbon, carbon fibers, etc. The porous carbon materials 11 facilitate easy introduction of oxygen from air.

The cathode 114 may further include a conductive material (not shown). A conductive material may include a metallic conductive material, for example, metal fibers, metal meshes, etc. Additionally, the conductive material may include metallic powder of copper, silver, nickel, aluminum, etc. Additionally, the conductive material may include an organic conductive material such as a polyphenylene derivative. The conductive material may be used alone or in a combination thereof.

The cathode 114 may further include an oxygen oxidation/reduction catalyst 12. The oxygen oxidation/reduction catalyst 12 may further include, for example, a precious metal such as platinum, gold, silver, palladium, ruthenium, rhodium, and osmium; an oxide catalyst such as manganese oxide, iron oxide, cobalt oxide, and nickel oxide, or an organic metal catalyst such as cobalt procyanin, but is not limited thereto, and any oxygen oxidation/reduction catalyst used in the related art may be used.

The oxygen oxidation/reduction catalyst 12 may be loaded in a supporting material. The supporting material may be, for example, an oxide, a zeolite, a clay mineral, or carbon. The oxide may include at least one oxide of alumina, silica, zirconium oxide, and titanium dioxide. The oxide may include at least one metal selected from Ce, Pr, Sm, Eu, Tb, Tm, Yb, Sb, Bi, V, Cr, Mn, Fe, Co, Ni, Cu, Nb, Mo, and W. The carbon may include, for example, carbon black such as Ketjen black, acetylene black, channel black, lamp black, etc.; and graphite such as natural graphite, artificial graphite, expanded graphite, etc.; active carbon; and carbon fibers, but is not limited thereto. Any carrier used in the related art may be used.

The cathode 114 may further include a binder. The binder may include a thermoplastic resin or a thermosetting resin, for example, polyethylene, polypropylene, polytetrafluoroethylene (PTFE), polyvinylidene fluoride (PVDF), styrene-butadiene rubber, tetrafluoroethylene-perfluoroalkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoro propylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluorormethylvinylether-tetrafluoro ethylene copolymer, or ethylene-acrylic acid copolymer alone or in combination, but is not limited thereto. Any binder used in the related art may be used.

The cathode 114 may be manufactured, for example, by preparing a cathode slurry by mixing an oxygen oxidation/reduction catalyst, a conductive material, and a binder, and then adding a suitable solvent; and coating the slurry on the surface of a first current collector followed by drying or, alternatively by compression molding on the first current collector for improvement of a cathode energy density. Furthermore, the cathode 114 may selectively include a lithium oxide. Furthermore, the oxygen oxidation/reduction catalyst may be omitted.

The first current collector 112 may be porous and serve as a gas diffusion layer for the diffusion of air 113. The first current collector 112 may use a net-like or mesh-like porous material to expedite the diffusion of oxygen, for example, a porous metal plate made of stainless steel wire SUS, nickel, aluminum, but is not limited thereto. Any first current collector used in the related art may be used. The first current collector 112 may be coated with an antioxidant metal or alloy film so as to prevent it from being oxidized. On the first current collector 112 are allocated a Teflon® case 111a and a pressing member 200 to deliver air to the cathode.

When desired, a gas diffusion layer 113 may be disposed on the first current collector 112. The gas diffusion layer 113 serves to increase the diffusion of oxygen so that the oxygen in the air can contact with the entire surface of the cathode 114. The gas diffusion layer 113 may be treated for water repellency. A material used for water repellency may be a porous membrane of fluororesin. The fluororesin may include at least one selected from polytetrafluoroethylene (PTFE), polyfluorovinylidene (PVdF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), and vinylidene fluoride-hexafluoropropylene-tetrafluoroethylene copolymer.

The electrolyte 13 may be a lithium ion conductive liquid electrolyte or a lithium ion conductive polymer electrolyte.

The lithium ion conductive liquid electrolyte may include a lithium salt and an aqueous solvent or a non-aqueous solvent. The non-aqueous solvent may include an aprotic solvent, for example, at least one solvent selected from a carbonate solvent, an ester solvent, an ether solvent, a ketone solvent, an amine solvent, a nitrile solvent, an amide solvent, and a sulfone solvent.

The carbonate solvent may include, for example, dimethyl carbonate (DMC), diethyl carbonate (DEC), ethyl methyl carbonate (EMC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC). The ester solvent may include, for example, methyl acetate (MA), ethyl acetate (EA), n-propyl acetate, dimethyl acetate, methyl propionate, ethyl propionate, γ-butyrolactone, decanolide, valerolactone, mevalonolactone, or caprolactone. The ether solvent may include, for example, dibutyl ether, tetraglyme, diglyme, dimethoxyethane, 2-methyltetrahydrofuran, or tetrahydrofuran (THF). The ketone solvent may include, for example, cyclohexanone. The amine solvent may include, for example, triethylamine or triphenylamine. The nitrile solvent may include, for example, R—CN (wherein R is a $C_2$-$C_{20}$ linear, branched or ring-structured hydrocarbon, and may include a double bond aromatic ring or ether bond). The amide solvent may include, for example, dimethyl formamide. The sulfone solvent may include, for example, sulforane.

The aprotic solvent may be used alone or in combination. When at least one aprotic solvent is mixed with another, a mixing ratio may be performed appropriately depending on the function of the lithium air battery, as it is apparent to one of ordinary skill in the art.

The lithium salt may include at least one salt selected from, for example, $LiPF_6$, $LiBF_4$, $LiSbF_6$, $LiAsF_6$, $LiN(SO_2C_2F_5)_2$, $LiN(SO_2F_2)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural integer), LiF, LiBr, LiCl, LiI, and $LiB(C_2O_4)_2$ (lithium bis(oxalate) borate). The lithium salt may be dissolved in a solvent to serve as a lithium ion supplier within the lithium air battery 300, for example, expedite the movement of lithium ions between the anode 117 and the cathode 114. The amount of the lithium salt may be from about 0.01 M to about 10 M, for example, from about 0.1 M to about 2.0 M. When the amount of the lithium salt is within the above range, the electrolyte will have suitable conductivity and viscosity, thus exhibiting an excellent electrolyte function, and also facilitating effective movement of lithium ions. In addition, other metal salts, for example, $AlCl_3$, $MgCl_2$, NaCl, KCl, NaBr, KBr, or $CaCl_2$, may be further included in addition to the lithium salt.

The lithium ion conductive polymer electrolyte may include a lithium salt and a lithium ion conductive polymer. The lithium ion conductive polymer may include polyethylene oxide, polypropylene oxide, polyacrylonitrile, polyvinylidenefluoride, polyurethane, polyacrylate, polymethacrylate, or cellulose resin. The alkylene oxide polymer such as polyethylene oxide or polypropylene oxide is a polymer which has an alkylene oxide chain wherein an alkylene group and ether oxygen are arranged alternately, and the alkylene oxide chain may have a branch. The weight average molecular weight of the lithium ion conductive polymer may be equal to or greater than 2,000 Daltons (Da), for example, from about 2,000 Da to about 1,000,000 Da. When the lithium ion conductive polymer with the weight average molecular weight is used, the physical properties and lithium ion conductivity of the electrolyte are excellent. However, the weight average molecular weight of the lithium ion conductive polymer is not limited thereto, and a lithium ion conductive polymer with any range of the weight average molecular weight may be used as long as it can prevent the growth of dendrites in a lithium air battery.

A part or the whole the electrolyte 13 may be impregnated in the cathode 114. The electrolyte 13, a part or the whole of which is impregnated in cathode 114, may be uniformly mixed with at least one additive 14 selected from a compound represented by Formula 1 and a copolymer including a repeating unit represented by Formula 2, and a porous carbon material of the cathode, thereby expanding the triple phase boundary, i.e., the boundary which contacts with the porous carbon material, the electrolyte, and the air. Accordingly, the charge/discharge capacity and charge/discharge efficiency of a cathode of the lithium air battery may be improved.

The electrolyte 13 may further include an ionic liquid. The ionic liquid may include a compound selected from, for example, straight, branched substituted ammonium, imidazolium, pyrrolidinium, piperidinium cations; and $PF_6^-$, $BF_4^-$, $CF_3SO_3^-$, $(CF_3SO_2)_2N^-$, $(C_2F_6SO_2)_2N^-$, and $(CN)_2N^-$ anions. The ionic liquid may further include an inorganic filler. If an inorganic filler is used, the durability of a battery may be improved when the inorganic filler is combined with a lithium metal anode. The inorganic filler may be, for example, at least one selected from $BaTiO_3$, $SiO_2$, $TiO_2$, $ZrO_2$, and zeolite. The amount of the inorganic filler may be, for example, from about 0.1 percent by weight (wt %) to about 20 wt %, for example, from about 8 wt % to about 15 wt % based on the total weight of the electrolyte of a lithium salt, a lithium ion conductive polymer, an ionic liquid, at least one additive selected from a compound represented by Formula 1 and a copolymer including a repeating unit represented by Formula 2.

The amount of at least one additive selected from a compound represented by a compound represented by Formula 1 and a copolymer including a repeating unit represented by Formula 2 in the electrolyte may be from about 0.1 wt % to about 50 wt %, for example, from about 0.1 wt % to about 40 wt %, and for example, from about 0.1 wt % to about 30 wt % based on the total weight of the electrolyte. When the amount of the additive is within the above range, it will facilitate easy oxygen introduction and suitable conductivity of lithium ions. It will also facilitate the formation of a triple phase boundary, the boundary that contacts with the porous carbon material and the electrolyte included in the cathode 114 and air, thus making it easy to fill in the pores in the cathode with $Li_2O_2$. As a result, discharge capacity and discharge voltage of the lithium air battery may be maximized, and the charge/discharge capacity and charge/discharge efficiency of the cathode of the lithium air battery may be improved.

The anode 117 may include a lithium metal, a lithium metal based alloy, and a lithium intercalation compound, but are not limited thereto. Any material to be used as an anode which includes lithium or enables intercalation/deintercalation of lithium ions used in the related art may be used. The lithium-based alloy may be, for example, an alloy between lithium and a metal selected from aluminum, tin, magnesium, indium, calcium, titanium, vanadium, etc. The anode determines the capacity of a lithium air battery and may be, for example, a lithium metal.

The anode 117 may include a binder. The binder may include, for example, polyfluorovinylidene(PVdF), polytetrafluoroethylene(PTFE), etc. The amount of the binder is not particularly limited but may be, for example, about 30 wt % or less based on that of the anode, for example, from about 1 wt % to about 10 wt % based on that of the anode.

A second current collector 118 may not be particularly limited as long as it has a predetermined level of lithium ion conductivity, for example, stainless steel, nickel, copper, aluminum, iron, titanium, carbon, etc. The second current collector 118 may be in the form of a thin film, a plate, a mesh, a grid, etc., for example, a copper foil. The second current collector 118 may be fixed to a Teflon® case 111b.

A lithium ion conductive solid electrolyte membrane 115 may be disposed in between the electrolyte 13 and the anode 117. The lithium ion conductive solid electrolyte membrane 115 may serve as a protective membrane to prevent the impurities such as water and oxygen contained in the aqueous electrolyte from directly reacting with lithium contained in the anode.

The lithium ion conductive solid electrolyte membrane 115 may be an inorganic material including a lithium ion conductive glass, a lithium ion conductive crystal (ceramic or glass-ceramic), or a combination thereof, but are not limited thereto, and any solid electrolyte having lithium ion conductivity and capable of protecting the anode that can be used in the related art may be used. For example, because of good chemical stability, the lithium ion conductive solid electrolyte membrane may be an oxide.

For example, the lithium ion conductive crystal may be $Li_{1+x+y}(Al, Ga)_x(Ti, Ge)_{2-x}Si_yP_{3-y}O_{12}$ (wherein $0 \leq x \leq 1$, $0 \leq y \leq 1$), for example, $0 \leq x \leq 0.4$, $0 \leq y \leq 0.6$, or $0.1 \leq x \leq 0.3$, $0.1 < y \leq 0.4$). The lithium ion conductive glass-ceramic may be, for example, lithium-aluminum-germanium-phosphate (LAGP), lithium-aluminum-titanium-phosphate (LATP), lithium-aluminum-titanium-silicon-phosphate (LATSP), etc.

The lithium ion conductive solid electrolyte membrane 115 may further include a polymer solid electrolyte in addition to the glass ceramic component. An example of the polymer solid electrolyte is a lithium salt-doped ethylene oxide. The lithium salt may be at least one selected from $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$. Additionally, the lithium ion conductive solid electrolyte membrane 115 may further include an inorganic solid electrolyte as necessary, for example, $Cu_3N$, $Li_3N$, LiPON, etc.

A second electrolyte 116 may be further included between the lithium ion conductive solid electrolyte membrane 115 and the anode 117. The second electrolyte 116 may be a lithium ion conductive liquid electrolyte or a lithium ion conductive polymer electrolyte. The lithium ion conductive polymer electrolyte may form a membrane. The lithium ion conductive liquid electrolyte and the lithium ion conductive polymer electrolyte are the same as defined above, and therefore, their descriptions are omitted here.

In addition, a separator (not shown) may be disposed in between the cathode 114 and the anode 117. The separator may not be particularly limited but any separator that can perform within the use range of the lithium air battery may be used, for example, a polymer non-woven fabric made of polypropylene or polyphenylene sulfide, or a porous film of olefin resin of polyethylene or polypropylene. They also may be used in a combination of at least two thereof.

In an embodiment, the lithium air battery 300 may be manufactured, for example, as follows:

First, an electrolyte, which includes as an additive at least one compound selected from a compound represented by Formula 1 and a copolymer including a repeating unit represented by Formula 2; a cathode including a porous carbon material; an anode for intercalating/deintercalating lithium ions; and a lithium ion conductive solid electrolyte membrane are prepared.

Subsequently, the anode is installed on one end of a case, and the cathode, on which the lithium ion conductive solid electrolyte membrane is installed, is installed to face the anode. Then, the electrolyte is filled in between the cathode and the anode, a porous current collector is disposed on the cathode, and the top of the porous current collector is pressed by a pressing member, which enables to deliver air to the cathode, to fix a cell, thereby completing a lithium air battery. In addition, a separator may be installed further between the lithium ion conductive solid electrolyte membrane and the cathode.

The case may be separated into an upper part which contacts with the anode and a lower part which contacts with the cathode, and an insulating resin may be inserted between the upper part and the lower part to electrically insulate these parts.

In another embodiment, the lithium air battery 300 may be manufactured, for example, as follows:

First, an electrolyte precursor including as an additive at least one selected from a compound represented by Formula 1 and a copolymer including a repeating unit represented by Formula 2 are prepared.

Subsequently, the anode is installed on one end of a case, and a cathode, on which the lithium ion conductive solid electrolyte membrane is installed to face the anode. Then, the electrolyte precursor is mixed with a cathode slurry including a porous carbon material, and the mixture is coated on the lithium ion conductive solid electrolyte membrane, and subjected to a heat treatment to impregnate part of or the entire electrolyte into the cathode. For example, the heat treatment may be performed at between about 60° C. and about 100° C. for between about 12 hours and about 36 hours. Then, the porous current collector is disposed on the cathode, and the top of the porous current collector is pressed by a pressing member, which enables to deliver air to the cathode, to fix a cell, thereby completing the manufacture of a lithium air battery. In addition, a separator may be installed further between the lithium ion conductive solid electrolyte membrane and the cathode.

The lithium air battery may be applicable both to lithium first batteries and lithium second batteries. The shape of the lithium air battery may not be particularly limited but may be manufactured in the form of a coin, a button, a sheet, a lamination, a cylinder, a plate, a cone, etc. Furthermore, the lithium air battery may be applicable to large batteries installed in an electric vehicle, etc.

The term "air" used herein is not limited to atmospheric air but may include combinations of gases including oxygen or a pure oxygen gas. The broad definition of "air" may be applicable to all applications, for example, an air battery, an air cathode, etc.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

EXAMPLES

Manufacture of a Lithium Air Battery

Example 1

1.1 Manufacture of a Lithium Ion Conductive Polymer Electrolyte Precursor

A lithium ion conductive polymer electrolyte precursor was prepared by mixing 2.07 g of polyethylene oxide (PEO) (about 600,000 of weight average molecular weight, available from Aldrich), 0.75 g of lithium bis(trifluoromethanesulfonyl)imide (LiTFSI), and 10 wt % of a copolymer represented by Formula 7 including a repeating unit as an additive based on the total amount of the electrolyte in N-methyl-2-pyrrolidone (NMP):

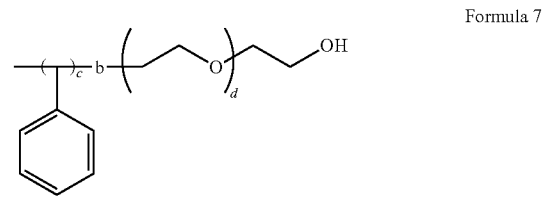

Formula 7

In Formula 7,
c is between 34 and 35, and d is between 1,522 and 1,523.

1.2 Manufacture of a Cathode where Lithium Ion Conductive Polymer Electrolyte is Impregnated Therein 0.1 g of Pt/C catalyst (28.4 wt % Pt/Vulcan electrocatalyst, TEC 10V30E, TKK, Japan) and 0.11 g of the lithium ion conductive polymer electrolyte precursor prepared in Example 1.1 were mixed and stirred for 15 minutes in a mortar to obtain a cathode slurry.

The cathode slurry was coated on top of a lithium ion conductive solid electrolyte membrane (OHARA, glass-ceramic) made of lithium-aluminum titanium phosphate (LATP), dried at about 80° C. for 48 hours, and placed in a drying room to obtain a cathode in which the lithium ion conductive polymer electrolyte is impregnated.

1.3 Manufacture of a Lithium Air Battery

A second current collector 118 (a copper foil), was fixed onto a Teflon® case 111b, an anode 117 (a lithium metal thin film anode), was installed thereon, and then a lithium ion conductive polymer electrolyte membrane 116 was disposed on a top of the lithium metal thin film anode 117.

The lithium ion conductive polymer electrolyte membrane 116 was manufactured by mixing 2.07 g of polyethylene oxide (PEO, about 600,000 of weight average molecular weight, available from Aldrich), and 0.75 g of LiTFSI in acetonitrile, and then slowly drying and removing the acetonitrile The cathode 114, in which the lithium ion conductive polymer electrolyte 116 is impregnated, prepared in Example 1.2 was laminated on top of the lithium ion conductive polymer electrolyte membrane 116. GDL (Toray, H030-5% PTFE) and a stainless steel wire mesh were respectively laminated on top of the cathode 114 as a gas diffusion layer 113 and a current collector 112, and a lithium air battery 300 including layers in the order of a second current collector (a copper thin film) 118—an anode (a lithium metal thin film anode) 117—a lithium ion conductive polymer electrolyte membrane 116—a lithium ion conductive solid electrolyte membrane (lithium ion conductive ceramic membrane) 115—a cathode 114 in which the electrolyte 13 (lithium ion conductive polymer electrolyte) is impregnated—a gas diffusion layer 113—a first current collector 112 (a stainless steel wire mesh), was manufactured. Lastly, the Teflon case 111a was closed, and the lithium air battery 300 was fixed by pressing the pressing member 200. The exemplary drawing of the lithium air battery is shown in FIG. 2.

Example 2

A lithium air battery was manufactured in the same manner as the cathode, in which the lithium ion conductive solid electrolyte is impregnated, was prepared in Example 1.2 and the lithium air battery was prepared in Example 1.3 of Example 1, except that a lithium ion conductive polymer electrolyte precursor manufactured in the same manner as in Example 1.1 was prepared by using 20 wt % of a copolymer including a repeating unit represented by Formula 7 based on the total amount of the electrolyte as an additive instead of 10 wt % of a copolymer including a repeating unit represented by Formula 7.

Example 3

A lithium air battery was manufactured in the same manner the cathode, in which the lithium ion conductive solid electrolyte is impregnated, was prepared in Example 1.2 and the lithium air battery was prepared in Example 1.3 of Example 1, except that a lithium ion conductive polymer electrolyte precursor manufactured in the same manner as in Example 1.1 was prepared by using 10 wt % of a copolymer including a repeating unit represented by Formula 8 based on the total amount of the electrolyte as an additive instead of 10 wt % of a copolymer including a repeating unit represented by Formula 7:

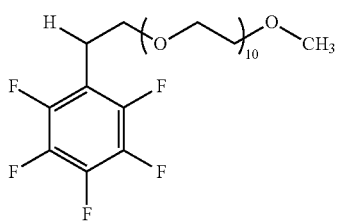

Formula 8

Comparative Example 1

A lithium air battery was manufactured in the same manner the cathode, in which the lithium ion conductive solid electrolyte is impregnated, was prepared in Example 1.2 and the lithium air battery was prepared in Example 1.3 of Example 1, except that a lithium ion conductive polymer electrolyte precursor manufactured in the same manner as in Example 1.1 was prepared without using 10 wt % of a copolymer including a repeating unit represented by Formula 7 based on the total amount of the electrolyte as an additive.

Evaluation Example 1

Evaluation of Charge/Discharge Characteristics

Figure 3:
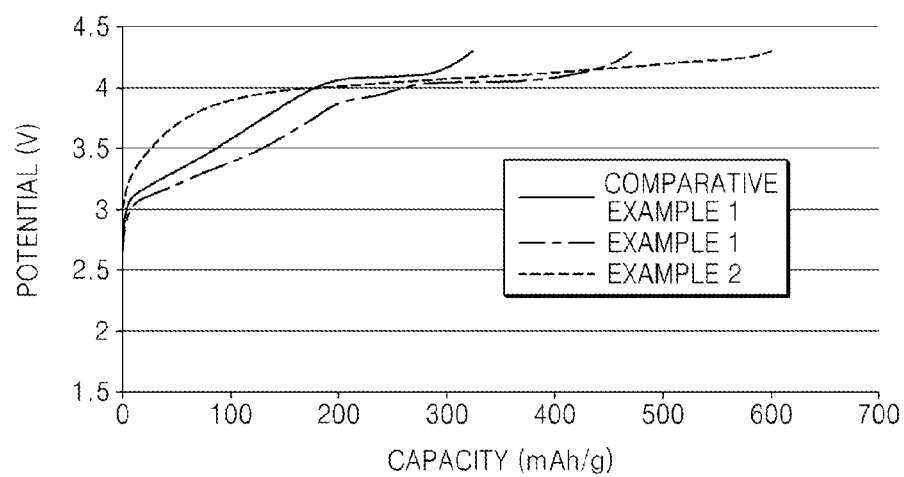
FIG. 3 is a graph of potential (volts, V) versus capacity (milliampere hours per gram) illustrating the first charging cycle of lithium air batteries manufactured in Examples 1 and 2, and Comparative Example 1.
Figure 4:
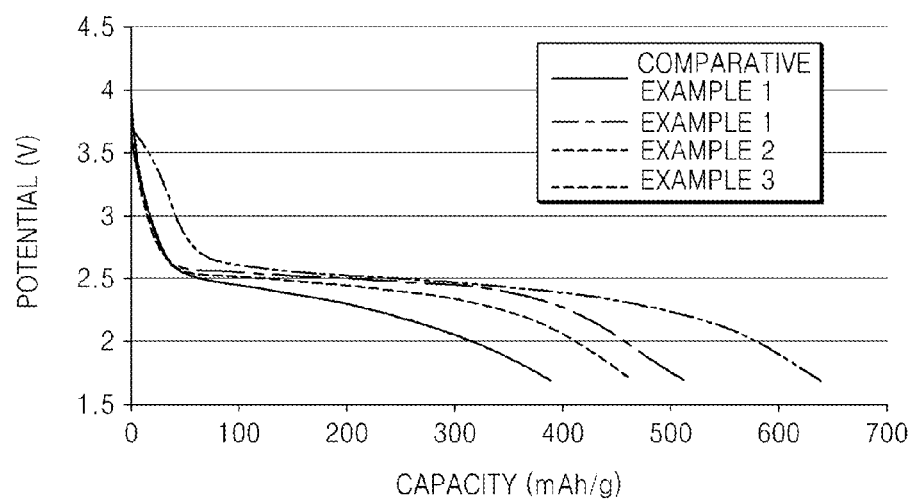
FIG. 4 is a graph of potential (volts, V) versus capacity (milliampere hours per gram) illustrating the first discharging cycle of lithium air batteries manufactured in Examples 1 to 3, and Comparative Example 1.

The lithium air batteries manufactured in Examples 1 to 3 and Comparative Example 1 at a temperature of 60° C. and a pressure of 1 atm under oxygen atmosphere were discharged at a constant current of 0.24 milliamperes per square centimeter (mA/cm$^2$) until a voltage was 1.7 V and then charged with the same current up to 4.3 V. The results of charge/discharge tests at the first cycle are shown in Tables 1 to 3 and FIGS. 3 and 4. The charge/discharge efficiency during the charge/discharge is defined by Equation 1, and the energy efficiency is defined by Equation 2. The unit weight at discharge capacity is a weight of the catalyst/supporting material in the cathode.

charge/discharge efficiency(%)=[(charge capacity)/(discharge capacity)×100]   Equation 1 energy efficiency(%)=[$E$(charge)/$E$(discharge)×100]   Equation 2

In Equation 2,

E (charging) denotes an average voltage during charging, and

E (discharge) denotes an average voltage during discharging.

The E (charge) and the E (discharge) are calculated by integrating the charge curve and the discharge curve in the electric capacity (x axis)–voltage (y axis) graph, and then diving the integrated values by the maximum discharge capacity and the maximum charge capacity, respectively.

TABLE 1

| Category | Charge Capacity (mAh/g) | Average Charge voltage (V) |
| --- | --- | --- |
| Comparative Example 1 | 323 | 3.79 |
| Example 1 | 472 | 3.78 |
| Example 2 | 599 | 4.02 |

TABLE 2

| Category | Discharge capacity (mAh/g) | Average Discharge voltage (V) |
| --- | --- | --- |
| Comparative Example 1 | 388 | 2.30 |
| Example 1 | 513 | 2.41 |
| Example 2 | 638 | 2.44 |
| Example 3 | 465 | 2.37 |

TABLE 3

| Category | Charge/discharge Efficiency (%) | Energy Efficiency (%) |
| --- | --- | --- |
| Comparative Example 1 | 83 | 61 |
| Example 1 | 92 | 64 |
| Example 2 | 94 | 61 |

As shown in Tables 1 to 3, the lithium air batteries manufactured in Examples 1 to 3 showed an increase in discharge capacity and average discharge voltage as compared to that manufactured in Comparative Example 1. Further, the lithium air batteries manufactured in Examples 1 and 2 showed an increase in charge capacity, average charge voltage, and charge/discharge efficiency as compared to that manufactured in Comparative Example 1, and also showed a little increase in energy efficiency.

While not wishing to be bound by a theory, the increase in the charge/discharge capacity, charge/discharge efficiency, and discharge voltage may be attributed to the addition of an additive having affinity for the porous carbon material and the electrolyte, thereby forming the boundary, i.e., a triple phase boundary, which contacts with the electrolyte, the porous carbon material contained in the cathode, and air.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present inventive concept as defined by the following claims.

What is claimed is:
1. A lithium air battery comprising:
an anode for intercalating/deintercalating lithium ions;
a cathode comprising oxygen as a cathode active material;
a lithium ion conductive solid electrolyte membrane disposed between the anode and the cathode; and
an electrolyte,
wherein the electrolyte is disposed between the lithium ion conductive solid electrolyte membrane and the cathode, and
wherein the electrolyte comprises at least one compound selected from a compound represented by Formula 1 and a copolymer comprising a repeating unit represented by Formula 2 as an additive:

Formula 1

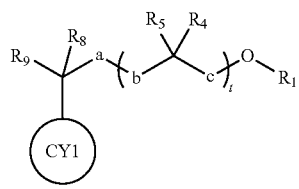

wherein, in Formula 1,
CY1 is a substituted or unsubstituted $C_6$-$C_{30}$ aromatic ring or a substituted or unsubstituted $C_3$-$C_{30}$ heteroaromatic ring selected from a substituted or unsubstituted pyrazole ring, a substituted or unsubstituted imidazole ring, a substituted or unsubstituted imidazopyridine ring, a substituted or unsubstituted imidazopyrimidine, a substituted or unsubstituted pyrazine ring, a substituted or unsubstituted pyrimidine ring, a substituted or unsubstituted pyridazine ring, a substituted or unsubstituted indole ring, a substituted or unsubstituted purine ring, a substituted or unsubstituted quinoline ring, a substituted or unsubstituted phthalazine ring, a substituted or unsubstituted naphthridine ring, a substituted or unsubstituted quinazoline ring, a substituted or unsubstituted cinnoline ring, a substituted or unsubstituted indazole ring, a substituted or unsubstituted carbazole ring, a substituted or unsubstituted phenazine ring, a substituted or unsubstituted phenanthridine ring, a substituted or unsubstituted triazine ring, a substituted or unsubstituted phenanthroline ring, and a substituted or unsubstituted quinoxaline ring;
a is a substituted or unsubstituted $C_1$-$C_5$ alkylene group;

b is

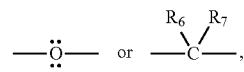

and c is

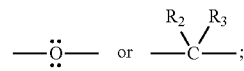

$R_1$ to $R_9$ are independently a hydrogen atom, a halogen atom, a nitro group, an amino group, a cyano group, a hydroxyl group, —C(=O)$R_a$, —C(=O)O$R_a$, —OCO(O$R_a$), —C=N($R_a$), —S$R_a$, —S(=O)$R_a$, —S(=O)$_2$$R_a$, —S(=O)$_2$NHS(=O)$_2$$R_a$, —P($R_a$)$_2$, —P(=O)($R_a$)$_2$, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_3$-$C_{30}$ cycloalkyl group, a substituted or unsubstituted $C_3$-$C_{30}$ cycloalkenyl group, a substituted or unsubstituted $C_2$-$C_{30}$ heterocycloalkyl group, a substituted or unsubstituted $C_2$-$C_{30}$ heterocycloalkenyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_6$-$C_{30}$ heteroaryl group, a substituted or unsubstituted $C_2$-$C_{30}$ heteroaryloxy group, a substituted or unsubstituted $C_3$-$C_{30}$ heteroarylalkyl group, or a combination thereof, wherein $R_a$ is a hydrogen atom, a $C_1$-$C_{10}$ alkyl group, or a $C_6$-$C_{20}$ aryl group; and
t is between 1 and 100,000; and Formula 2

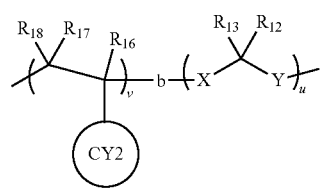

wherein, in Formula 2,
CY2 is a substituted or unsubstituted $C_6$-$C_{30}$ aromatic ring or a substituted or unsubstituted $C_3$-$C_{30}$ heteroaromatic ring;
b is a block copolymer;
X is

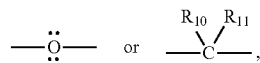

and Y is

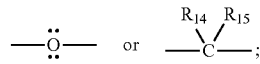

$R_{10}$ to $R_{18}$ are independently a hydrogen atom, a halogen atom, a nitro group, an amino group, a cyano group, a hydroxyl group, —C(=O)$R_{a1}$, —C(=O)O$R_{a1}$, —OCO(OR$_{a1}$), —C=N(R$_{a1}$), —SR$_{a1}$, —S(=O)R$_{a1}$, —S(=O)$_2$R$_{a1}$, —S(=O)$_2$NHS(=O)$_2$R$_{a1}$, —P(R$_{a1}$)$_2$, —P(=O)(R$_{a1}$)$_2$, a substituted or unsubstituted C$_1$-C$_{20}$ alkyl group, a substituted or unsubstituted C$_1$-C$_{20}$ alkoxy group, a substituted or unsubstituted C$_2$-C$_{20}$ alkenyl group, a substituted or unsubstituted C$_2$-C$_{20}$ alkynyl group, a substituted or unsubstituted C$_3$-C$_{30}$ cycloalkyl group, a substituted or unsubstituted C$_3$-C$_{30}$ cycloalkenyl group, a substituted or unsubstituted C$_2$-C$_{30}$ heterocycloalkyl group, a substituted or unsubstituted C$_2$-C$_{30}$ heterocycloalkenyl group, a substituted or unsubstituted C$_6$-C$_{30}$ aryl group, a substituted or unsubstituted C$_6$-C$_{30}$ aryloxy group, a substituted or unsubstituted C$_7$-C$_{30}$ arylalkyl group, a substituted or unsubstituted C$_6$-C$_{30}$ heteroaryl group, a substituted or unsubstituted C$_2$-C$_{30}$ heteroaryloxy group, a substituted or unsubstituted C$_3$-C$_{30}$ heteroarylalkyl group, or a combination thereof, wherein R$_{a1}$ is a hydrogen atom, a C$_1$-C$_{10}$ alkyl group, or a C$_6$-C$_{20}$ aryl group; and v and u are each independently between 1 and 100,000.

2. The lithium air battery of claim 1, wherein CY1 and CY2 are each independently a substituted or unsubstituted benzene ring, a substituted or unsubstituted pentacene ring, a substituted or unsubstituted indene ring, a substituted or unsubstituted naphthalene ring, a substituted or unsubstituted azulene ring, a substituted or unsubstituted heptalene ring, a substituted or unsubstituted indacene ring, a substituted or unsubstituted acenaphthalene ring, a substituted or unsubstituted fluorene ring, a substituted or unsubstituted phenalene ring, a substituted or unsubstituted phenanthrene ring, a substituted or unsubstituted anthracene ring, a substituted or unsubstituted fluoranthene ring, a substituted or unsubstituted triphenylene ring, a substituted or unsubstituted pyrene ring, a substituted or unsubstituted benzopyrene ring, a substituted or unsubstituted chrysene ring, a substituted or unsubstituted naphthacene ring, a substituted or unsubstituted phycene ring, a substituted or unsubstituted perylene ring, a substituted or unsubstituted pentaphene ring, a substituted or unsubstituted hexacene ring, a substituted or unsubstituted pyrrole ring, a substituted or unsubstituted pyrazole ring, a substituted or unsubstituted imidazole ring, a substituted or unsubstituted imidazopyridine ring, a substituted or unsubstituted imidazopyrimidine, a substituted or unsubstituted pyridine ring, a substituted or unsubstituted pyrazine ring, a substituted or unsubstituted pyrimidine ring, a substituted or unsubstituted pyridazine ring, a substituted or unsubstituted indole ring, a substituted or unsubstituted purine ring, a substituted or unsubstituted quinoline ring, a substituted or unsubstituted phthalazine ring, a substituted or unsubstituted naphthridine ring, a substituted or unsubstituted quinazoline ring, a substituted or unsubstituted cinnoline ring, a substituted or unsubstituted indazole ring, a substituted or unsubstituted carbazole ring, a substituted or unsubstituted phenazine ring, a substituted or unsubstituted phenanthridine ring, a substituted or unsubstituted triazine ring, a substituted or unsubstituted phenanthroline ring, or a substituted or unsubstituted quinoxaline ring.

3. The lithium air battery of claim 1, wherein the electrolyte comprises at least one compound selected from a compound represented by Formula 3 and a copolymer comprising a repeating unit represented by Formula 4 as an additive:

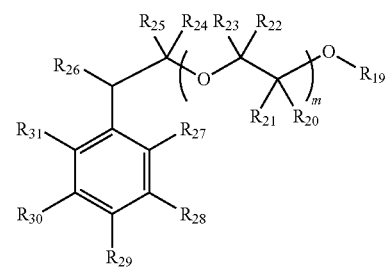

Formula 3 wherein, in Formula 3,

R$_{19}$ to R$_{31}$ are each independently a hydrogen atom, a halogen atom, a nitro group, an amino group, a cyano group, a hydroxyl group, —C(=O)R$_{a2}$, —C(=O)OR$_{a2}$, —OCO(OR$_{a2}$), —C=N(R$_{a2}$), —SR$_{a2}$, —S(=O)R$_{a2}$, —S(=O)$_2$R$_{a2}$, —S(=O)$_2$NHS(=O)$_2$R$_{a2}$, —P(R$_{a2}$)$_2$, —P(=O)(R$_{a2}$)$_2$, a substituted or unsubstituted C$_1$-C$_{20}$ alkyl group, a substituted or unsubstituted C$_1$-C$_{20}$ alkoxy group, a substituted or unsubstituted C$_2$-C$_{20}$ alkenyl group, a substituted or unsubstituted C$_2$-C$_{20}$ alkynyl group, a substituted or unsubstituted C$_3$-C$_{30}$ cycloalkyl group, a substituted or unsubstituted C$_3$-C$_{30}$ cycloalkenyl group, a substituted or unsubstituted C$_2$-C$_{30}$ heterocycloalkyl group, a substituted or unsubstituted C$_2$-C$_{30}$ heterocycloalkenyl group, a substituted or unsubstituted C$_6$-C$_{30}$ aryl group, a substituted or unsubstituted C$_6$-C$_{30}$ aryloxy group, a substituted or unsubstituted C$_7$-C$_{30}$ arylalkyl group, a substituted or unsubstituted C$_6$-C$_{30}$ heteroaryl group, a substituted or unsubstituted C$_2$-C$_{30}$ heteroaryloxy group, a substituted or unsubstituted C$_3$-C$_{30}$ heteroarylalkyl group, or a combination thereof, wherein R$_{a2}$ is a hydrogen atom, a C$_1$-C$_{10}$ alkyl group or a C$_6$-C$_{20}$ aryl group; and m is between 1 and 100,000;

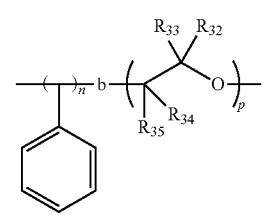

Formula 4 wherein, in Formula 4, b is a block copolymer;

R$_{32}$ to R$_{35}$ are each independently a hydrogen atom, a halogen atom, a nitro group, an amino group, a cyano group, a hydroxyl group, —C(=O)R$_{a3}$, —C(=O)OR$_{a3}$, —OCO(OR$_{a3}$), —C=N(R$_{a3}$), —SR$_{a3}$, —S(=O)R$_{a3}$, —S(=O)$_2$R$_{a3}$, —S(=O)$_2$NHS(=O)$_2$R$_{a3}$, —P(R$_{a3}$)$_2$, —P(=O)(R$_{a3}$)$_2$, a substituted or unsubstituted C$_1$-C$_{20}$ alkyl group, a substituted or unsubstituted C$_1$-C$_{20}$ alkoxy group, a substituted or unsubstituted C$_2$-C$_{20}$ alkenyl group, a substituted or unsubstituted C$_2$-C$_{20}$ alkynyl group, a substituted or unsubstituted C$_3$-C$_{30}$ cycloalkyl group, a substituted or unsubstituted C$_3$-C$_{30}$ cycloalkenyl group, a substituted or unsubstituted C$_2$-C$_{30}$ heterocycloalkyl group, a substituted or unsubstituted C$_2$-C$_{30}$ heterocycloalkenyl group, a substituted or unsubstituted C$_6$-C$_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_6$-$C_{30}$ heteroaryl group, a substituted or unsubstituted $C_2$-$C_{30}$ heteroaryloxy group, a substituted or unsubstituted $C_3$-$C_{30}$ heteroarylalkyl group, or a combination thereof, wherein $R_{a3}$ is a hydrogen atom, a $C_1$-$C_{10}$ alkyl group, or a $C_6$-$C_{20}$ aryl group; and n and p are each independently between 1 and 100,000.

4. The lithium air battery of claim 1, wherein the electrolyte comprises at least one compound selected from a compound represented by Formula 5 and a copolymer comprising a repeating unit represented by Formula 6 as an additive:

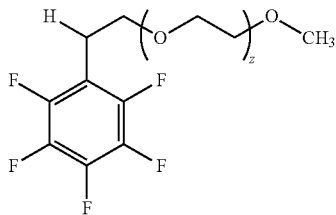

Formula 5 wherein, in Formula 5,
z is between 1 and 100;

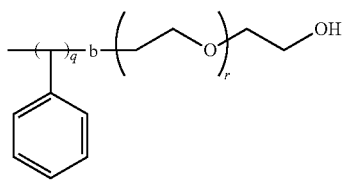

Formula 6 wherein, in Formula 6,
b is a block copolymer;
q is between 10 and 100, and
r is between 1,500 and 2,000.

5. The lithium air battery of claim 1, wherein the cathode comprises a porous carbon material.

6. The lithium air battery of claim 1, wherein the cathode further comprises a conductive material.

7. The lithium air battery of claim 1, wherein the cathode further comprises an oxygen oxidation/reduction catalyst.

8. The lithium air battery of claim 1, wherein the electrolyte is a lithium ion conductive liquid electrolyte or a lithium ion conductive polymer electrolyte.

9. The lithium air battery of claim 8, wherein the lithium ion conductive liquid electrolyte comprises a lithium salt and an aqueous solvent or a non-aqueous solvent.

10. The lithium air battery of claim 9, wherein the non-aqueous solvent comprises at least one solvent selected from a carbonate solvent, an ester solvent, an ether solvent, a ketone solvent, an amine solvent, a nitrile solvent, an amide solvent, and a sulfone solvent.

11. The lithium air battery of claim 8, wherein the lithium ion conductive polymer electrolyte comprises a lithium salt and a lithium ion conductive polymer.

12. The lithium air battery of claim 11, wherein the lithium ion conductive polymer comprises polyethylene oxide, polypropylene oxide, polyacrylonitrile, polyvinylidenefluoride, polyurethane, polyacrylate, polymethacrylate, or cellulose resin.

13. The lithium air battery of claim 9, wherein the lithium salt is at least one selected from $LiPF_6$, $LiBF_4$, $LiSbF_6$, $LiAsF_6$, $LiN(SO_2C_2F_5)_2$, $LiN(SO_2F_2)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are natural integers), LiF, LiBr, LiCl, LiI, and $LiB(C_2O_4)_2$(lithium bis(oxalate) borate).

14. The lithium air battery of claim 1, wherein at least a part of the electrolyte is impregnated in the cathode.

15. The lithium air battery of claim 1, wherein the electrolyte further comprises an ionic liquid.

16. The lithium air battery of claim 15, wherein the ionic liquid comprises an inorganic filler.

17. The lithium air battery of claim 1, wherein an amount of the additive is from about 0.1 percent by weight to about 50 percent by weight based on the total amount of the electrolyte.

18. The lithium air battery of claim 1, wherein the anode comprises a lithium metal, a lithium metal based alloy, and a lithium intercalation compound.

19. The lithium air battery of claim 1, wherein the lithium ion conductive solid electrolyte membrane is a lithium ion conductive glass, a lithium ion conductive crystal (ceramic or glass-ceramic), or a combination thereof.

20. The lithium air battery of claim 1, wherein the lithium ion conductive solid electrolyte membrane further comprises a polymer solid electrolyte.

* * * * *